US012689570B2

(12) United States Patent
Vasudevan et al.

(10) Patent No.: US 12,689,570 B2
(45) Date of Patent: Jul. 21, 2026

(54) GREY FAILURE DETECTION ON NETWORK OPERATING SYSTEM

(71) Applicant: Cisco Technology, Inc., San Jose, CA (US)

(72) Inventors: Bharath Vasudevan, Bangalore (IN); Anbu Chezhian Gunalan, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 6 days.

(21) Appl. No.: 18/634,771

(22) Filed: Apr. 12, 2024

(65) Prior Publication Data

US 2025/0323848 A1 Oct. 16, 2025

(51) Int. Cl.
*H04L 43/062* (2022.01)
*H04L 43/0817* (2022.01)

(52) U.S. Cl.
CPC ........ *H04L 43/062* (2013.01); *H04L 43/0817* (2013.01)

(58) Field of Classification Search
CPC .......................... H04L 43/062; H04L 43/0817
See application file for complete search history.

(56) References Cited

U.S. PATENT DOCUMENTS

| | | | |
|---|---|---|---|
| 7,733,787 B1 | 6/2010 | Paterson et al. | |
| 9,553,788 B1 * | 1/2017 | Callan ................. | H04L 43/0811 |
| 9,979,619 B2 * | 5/2018 | Vasseur ............... | H04L 12/1868 |
| 10,461,992 B1 * | 10/2019 | Sagar ...................... | H04L 43/50 |
| 10,656,988 B1 | 5/2020 | McElhinney et al. | |
| 11,388,079 B1 * | 7/2022 | Ramabadran ........... | H04L 63/14 |
| 11,514,084 B2 * | 11/2022 | Savalle ................. | H04L 41/142 |
| 2015/0309906 A1 * | 10/2015 | Salame ............... | G06F 11/3692 |
| | | | 714/33 |
| 2018/0115455 A1 | 4/2018 | Serrano Garcia et al. | |
| 2018/0123922 A1 | 5/2018 | Nataraj et al. | |
| 2018/0367414 A1 * | 12/2018 | Raghavendra ........ | H04L 43/026 |
| 2021/0303381 A1 * | 9/2021 | Baldassarre ............ | G06N 5/04 |
| 2022/0116265 A1 | 4/2022 | Boyle, III et al. | |
| 2022/0164367 A1 * | 5/2022 | Narayanan ............ | G06F 16/278 |
| 2022/0321457 A1 * | 10/2022 | Hari ........................ | H04L 45/28 |
| 2022/0358148 A1 * | 11/2022 | Sloane ............... | G06F 16/2379 |
| 2023/0076842 A1 * | 3/2023 | Panesar ................... | H04L 45/24 |
| 2023/0140115 A1 * | 5/2023 | Vasseur ................... | H04L 45/50 |
| | | | 709/238 |
| 2023/0359520 A1 | 11/2023 | Edamadaka et al. | |

(Continued)

FOREIGN PATENT DOCUMENTS

CN 112383771 A * 2/2021 ........... H04N 17/004

*Primary Examiner* — Oanh Duong
(74) *Attorney, Agent, or Firm* — Polsinelli P.C.

(57) ABSTRACT

Systems, methods, and computer-readable media are provided for detecting grey failures on a network. An example method can include receiving, by a network controller, event data for a network node, generating, by the network controller, a first metric and a second metric based on the event data, determining, by the network controller, a first pattern of growth of the first metric and a second pattern of growth of the second metric over a sliding window, determining, by the network controller, a correlation across the first metric and the second metric based on the first pattern and the second pattern, and determining, by the network controller, a grey failure of the network node based on the correlation.

20 Claims, 7 Drawing Sheets

400

RECEIVE, BY A NETWORK OPERATING SYSTEM, EVENT DATA FOR A NETWORK PROCESSING UNIT 402

GENERATE, BY THE NETWORK OPERATING SYSTEM, A FIRST METRIC AND A SECOND METRIC BASED ON THE EVENT DATA, WHEREIN THE FIRST METRIC IS ASSOCIATED WITH A FIRST NETWORK PARAMETER OF THE EVENT DATA AND THE SECOND METRIC IS ASSOCIATED WITH A SECOND NETWORK PARAMETER OF THE EVENT DATA 404

DETERMINE, BY THE NETWORK OPERATING SYSTEM, A FIRST PATTERN OF GROWTH OF THE FIRST METRIC AND A SECOND PATTERN OF GROWTH OF THE SECOND METRIC OVER A SLIDING WINDOW 406

DETERMINE, BY THE NETWORK OPERATING SYSTEM, A CORRELATION ACROSS THE FIRST METRIC AND THE SECOND METRIC BASED ON THE FIRST PATTERN AND THE SECOND PATTERN 408

DETERMINE, BY THE NETWORK OPERATING SYSTEM, A GREY FAILURE OF THE NETWORK PROCESSING UNIT BASED ON THE CORRELATION 410

(56) References Cited

U.S. PATENT DOCUMENTS

| | | | | |
|---|---|---|---|---|
| 2023/0370352 A1* | 11/2023 | Chasdai | ............. | H04L 43/0835 |
| 2024/0406078 A1* | 12/2024 | Savalle | .................. | H04L 43/04 |
| 2025/0007800 A1* | 1/2025 | Bjarnason | .............. | H04L 43/08 |

* cited by examiner

400

RECEIVE, BY A NETWORK OPERATING SYSTEM, EVENT DATA FOR A NETWORK PROCESSING UNIT 402

GENERATE, BY THE NETWORK OPERATING SYSTEM, A FIRST METRIC AND A SECOND METRIC BASED ON THE EVENT DATA, WHEREIN THE FIRST METRIC IS ASSOCIATED WITH A FIRST NETWORK PARAMETER OF THE EVENT DATA AND THE SECOND METRIC IS ASSOCIATED WITH A SECOND NETWORK PARAMETER OF THE EVENT DATA 404

DETERMINE, BY THE NETWORK OPERATING SYSTEM, A FIRST PATTERN OF GROWTH OF THE FIRST METRIC AND A SECOND PATTERN OF GROWTH OF THE SECOND METRIC OVER A SLIDING WINDOW 406

DETERMINE, BY THE NETWORK OPERATING SYSTEM, A CORRELATION ACROSS THE FIRST METRIC AND THE SECOND METRIC BASED ON THE FIRST PATTERN AND THE SECOND PATTERN 408

DETERMINE, BY THE NETWORK OPERATING SYSTEM, A GREY FAILURE OF THE NETWORK PROCESSING UNIT BASED ON THE CORRELATION 410

FIG. 4

GREY FAILURE DETECTION ON NETWORK OPERATING SYSTEM

TECHNICAL FIELD

The subject matter of this disclosure relates in general to the field of computer network security, and more particularly to detection of unclassified (gray) failures in a computer network that can cause systemic failures.

BACKGROUND

As the world moves more and more towards a digitally connected world, the underlying technology for the digital world is a web of networks. Various different types of networks are used to connect one user to another user, website, domain, service provider, etc. Consequently, disruptions of networks can cause issues across the world. Some failures and/or their causes can be easily identified. However, some failures are more difficult to identify, remedy, and/or remove.

BRIEF DESCRIPTION OF THE SEVERAL VIEWS OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 4 illustrates an example method for detecting grey failures in a network, in accordance with some aspects of the disclosed technology.

DESCRIPTION OF EXAMPLE EMBODIMENTS

Figure 1:
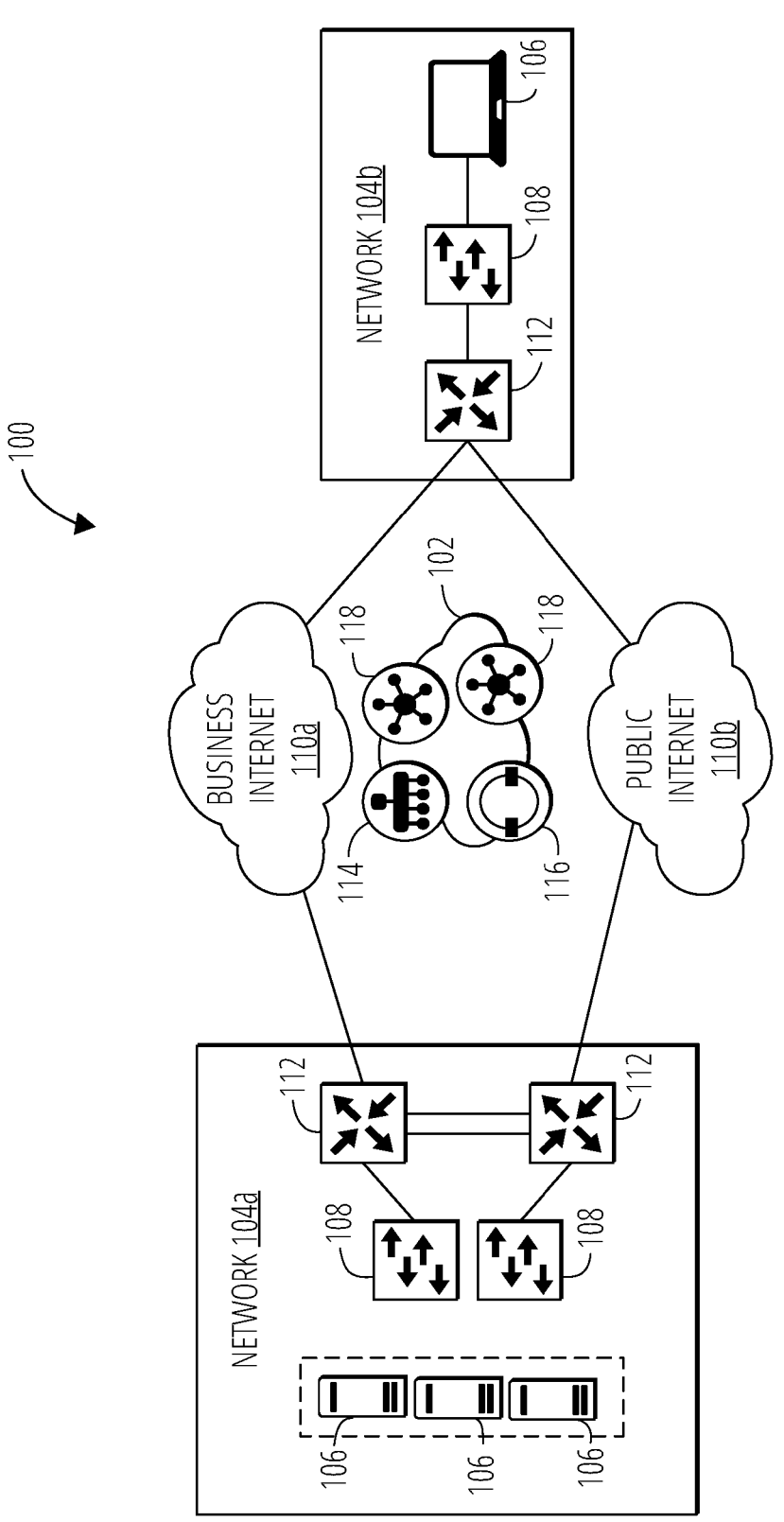
FIG. 1 illustrates an example network environment, in accordance with some aspects of the disclosed technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

In one aspect, a method for detecting grey failures on a network can include receiving, by a network controller, event data for a network node, generating, by the network controller, a first metric and a second metric based on the event data, where the first metric is associated with a first network parameter of the event data and the second metric is associated with a second network parameter of the event data, determining, by the network controller, a first pattern of growth of the first metric and a second pattern of growth of the second metric over a sliding window, determining, by the network controller, a correlation across the first metric and the second metric based on the first pattern and the second pattern, and determining, by the net work controller, a grey failure of the network node based on the correlation.

In another aspect, the first metric is a number of drop packet captures per flow, and where determining the first pattern of growth of the first metric includes determining that an output rate of the network node is less than an input rate of the network node for a flow during the sliding window.

In another aspect, the first metric includes an in/out packet counter per network node, and wherein the first pattern of growth indicates a network node traffic delta.

In another aspect, the method may also include receiving, by the network controller, a selection by a user to track the first network parameter.

In another aspect, determining the correlation includes an analysis based on one or more relation functions, sampled network parameter data, threshold classifications, and historical event data.

In another aspect, the event data is hierarchically sent from the network node to the network controller through a network of the network controller and the network node.

In another aspect, the network node is a leaf network node of the network.

In one aspect, a non-transitory computer-readable medium includes instructions thereon, where the instructions, when executed by one or more processors, cause the one or more processors to perform operations including receiving, by a network controller of a network, event data for a network node, generating, by the network controller, a first metric and a second metric based on the event data, where the first metric is associated with a first network parameter of the event data and the second metric is associated with a second network parameter of the event data, determining, by the network controller, a first pattern of growth of the first metric and a second pattern of growth of the second metric over a sliding window, determining, by the network controller, a correlation across the first metric and the second metric based on the first pattern and the second pattern, and determining, by the network controller, a grey failure of the network node based on the correlation.

In one aspect, a system includes a processor and a non-transitory memory storing computer-executable instructions thereon, where the computer-executable instructions, when executed by the processor, cause the processor to perform operations including receiving, by a network controller of a network, event data for a network node, generating, by the network controller, a first metric and a second metric based on the event data, where the first metric is associated with a first network parameter of the event data and the second metric is associated with a second network parameter of the event data, determining, by the network controller, a first pattern of growth of the first metric and a second pattern of growth of the second metric over a sliding window, determining, by the network controller, a correlation across the first metric and the second metric based on the first pattern and the second pattern, and determining, by the network controller, a grey failure of the network node based on the correlation.

Other technical features may be readily apparent to one skilled in the art from the following figures, descriptions, and claims.

EXAMPLE EMBODIMENTS

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

As the world moves more and more towards a digitally connected world, the underlying technology for the digital world is a web of networks. Various different types of networks are used to connect one user to another user, website, domain, service provider, etc. Consequently, disruptions of networks can cause issues across the world. Some failures and/or their causes can be easily identified. However, some failures are more difficult to identify, remedy, and/or remove.

Grey failures is a term that refers to network issues (failures, potential failures) that do not fall into any particular class of known issues that can be identified by simply tracking a single event or parameter. Accordingly, grey failures are not easily detectable and/or cannot be measured. These grey failures can lead to intermittent or even permanent systemic failures. Grey failures in networks and cloud scale systems are even more complicated due to the scale of involved entities and the silent nature of these events.

Grey failures are a class of problems that typically involve multi-dimensional metrics, where multiple unidimensional metrics need to be correlated with respect to time to deduce an action. These classes of failures cannot be detected because the module that reacts to a given failure may not know about any other failures or irregularities, which may be the source of major fault in the network. Some network processing units (NPU) drop packets due to some exceptions. For example, a NPU may drop packets due to a lookup failure in the device, which is a normal and common occurrence in a production network due to the occurrence of convergence events. Consequently, it is challenging to detect these failures and separate the real failure(s) from the convergence drop. These types of grey failures are common challenges for datacenters configured to be scalable to massive sizes.

Existing methods of detecting such failures are time-consuming and require intensive efforts from developers. Additionally, having monitoring mechanisms such as bidirectional forwarding detection (BFD) for each traffic interaction in a traffic flow can add substantial overhead and is not a viable and/or practical operational solution. Without proactively detecting such failures, these grey failures will cause undetected/unknown traffic loss for substantial periods of time for consumers, companies, and other Internet users. Furthermore, these grey failures can translate to loss of critical debugging data, due to the length of time needed to identify or otherwise detect the failures.

Detecting grey failures in NPU can be further challenging in scenarios where traffic does not recover after an application-specific integrated circuit (ASIC) resets. For example, conventional NPUs on network boxes support soft reset capabilities, which ensure less than 50 milliseconds of traffic outage. Soft resets of the NPU can be the recommended action for specific sets of blocks inside the ASIC. After the reset, the NPU-driver will check if these interruptions occur again within a certain time window. If these error interrupt counts go above a threshold, then other components may be reset. However, performing too many resets of the ASIC can lead to permanent traffic drop. In many instances, these are undetected, permanent traffic drops. Additionally, there are no mechanisms to check whether a NPU has recovered the traffic after a reset.

The disclosed technology addresses the need in the art for detecting grey failures. The present technology includes systems and methods for detecting grey failures and solving these problems. An example pipeline or workflow includes collecting data, analyzing metrics, correlating metrics, and performing corrective actions. The collector stage can include gathering data across different sources, which is then analyzed for metrics and patterns based on the metrics. In some examples, such metrics can be provided to a machine learning (ML) model configured to receive the metrics and determine or otherwise detect grey failures and/or their causes. The ML model can then output the detected grey failure and/or the cause thereof. In some instances, the system can be configured to perform one or more actions based on the detected grey failure.

The disclosure continues with a description of a non-limiting example of a network topology in which grey failure detection processes of the present disclosure may be applied.

Turning now to the figures, FIG. 1 illustrates an example of a network 100. Network 100 can include a management network 102, a pair of network sites 104a and 104b (collectively, network sites 104) (e.g., data center(s), campus network(s), the branch office network(s), the home office network(s), cloud service provider network(s), etc.), and a pair of transport networks 110a and 110b (collectively, the transport networks 110). Transport networks 110 can be Internet transport network. Management network 102 can include one or more network orchestrator appliance(s) 116, one or more network management appliance(s) 114, and one or more network controller appliance(s) 118. Although management network 102 is shown as a single network in this example, one of ordinary skill in the art will understand that each element of management network 102 can be distributed across any number of networks and/or be co-located with network sites 104. In this example, each element of management network 102 can be reached through either transport network 110a or transport network 110b.

Each site can include one or more endpoints 106 connected to site network devices 108. One or more endpoints 106 can include general purpose computing devices (e.g., servers, workstations, desktop computers, etc.), mobile computing devices (e.g., laptops, tablets, mobile phones, etc.), wearable devices (e.g., watches, glasses or other head-mounted displays (HMDs), ear devices, etc.), and so forth. One or more endpoints 106 can also include Internet of Things (IoT) devices or equipment, such as agricultural equipment (e.g., livestock tracking and management systems, watering devices, unmanned aerial vehicles (UAVs), etc.); connected cars and other vehicles; smart home sensors and devices (e.g., alarm systems, security cameras, lighting, appliances, media players, HVAC equipment, utility meters, windows, automatic doors, door bells, locks, etc.); office equipment (e.g., desktop phones, copiers, fax machines, etc.); healthcare devices (e.g., pacemakers, biometric sensors, medical equipment, etc.); industrial equipment (e.g., robots, factory machinery, construction equipment, industrial sensors, etc.); retail equipment (e.g., vending machines, point of sale (POS) devices, Radio Frequency Identification (RFID) tags, etc.); smart city devices (e.g., street lamps, parking meters, waste management sensors, etc.); transportation and logistical equipment (e.g., turnstiles, rental car trackers, navigational devices, inventory monitors, etc.); and so forth.

Site network devices 108 can include physical or virtual switches, routers, and other network devices. Although network site 104a is shown including a pair of site network devices and network site 104b is shown including a single site network device in this example, site network devices 108 can comprise any number of network devices in any network topology, including multi-tier (e.g., core, distribution, and access tiers), spine-and-leaf, mesh, tree, bus, hub and spoke, and so forth. For example, in some examples, one or more data center networks may implement the Cisco® Application Centric Infrastructure (ACI) architecture and/or one or more campus networks may implement the Cisco® Software Defined Access (SD-Access or SDA) architecture. Site network devices 108 can connect one or more endpoints 106 to edge network devices 112, and edge network devices 112 can be used to directly connect to transport networks 110.

In some examples, "color" can be used to identify an individual WAN transport network, and different WAN transport networks may be assigned different colors (e.g., MPLS, private1, biz-internet, metro-ethernet, LTE, etc.). In this example, network 100 can utilize a color called "biz-internet" for transport network 110a and a color called "public-internet" for transport network 110b.

In some examples, each edge network device 112 can form a Datagram Transport Layer Security (DTLS) or TLS control connection to network controller appliance(s) 118 and connect to any network controller appliance(s) 118 over each transport network 110. In some examples, edge network devices 112 can also securely connect to edge network devices in other sites via IPSec tunnels. In some examples, the BFD protocol may be used within each of these tunnels to detect loss, latency, jitter, and path failures.

On edge network devices 112, color can be used help to identify or distinguish an individual WAN transport tunnel (e.g., no same color may be used twice on a single edge network device). Colors by themselves can also have significance. For example, the colors metro-ethernet, mpls, and private1, private2, private3, private4, private5, and private6 may be considered private colors, which can be used for private networks or in places where there is no NAT addressing of the transport IP endpoints (e.g., because there may be no NAT between two endpoints of the same color). When edge network devices 112 use a private color, they may attempt to build IPSec tunnels to other edge network devices using native, private, underlay IP addresses. The public colors can include 3g, biz, internet, blue, bronze, custom1, custom2, custom3, default, gold, green, lte, public-internet, red, and silver. The public colors may be used by the edge network devices 112 to build tunnels to post-NAT IP addresses (if there is NAT involved). If the edge network devices 112 use private colors and need NAT to communicate to other private colors, the carrier setting in the configuration can dictate whether edge network devices 112 use private or public IP addresses. Using this setting, two private colors can establish a session when one or both are using NAT.

Figure 2:
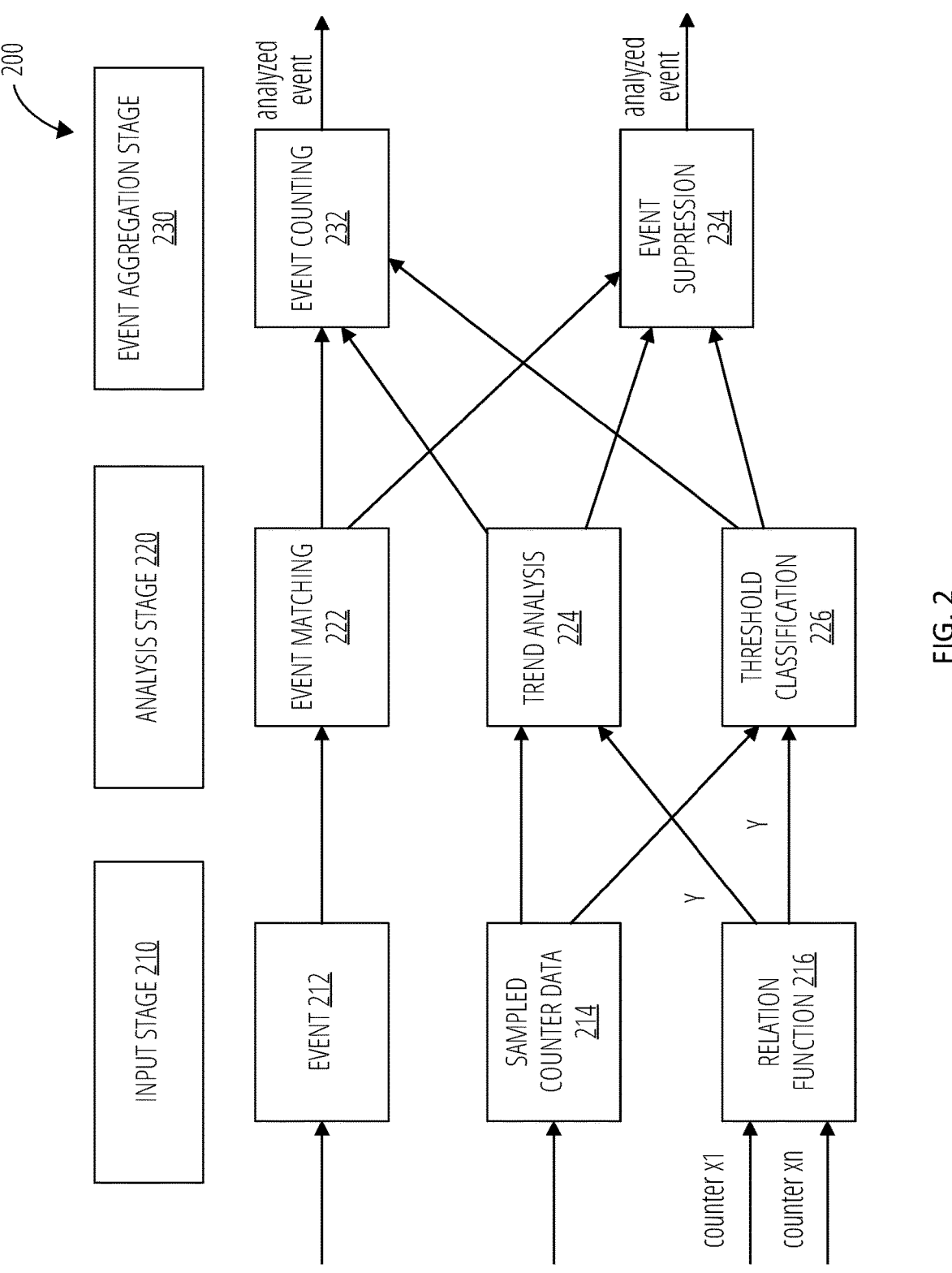
FIG. 2 illustrates an example workflow for detecting grey failures in a network, in accordance with some aspects of the disclosed technology.

FIG. 2 illustrates an example workflow 200 for detecting grey failures on a network. Example workflow 200 can include an input stage 210, an analysis stage 220, and an event aggregation stage 230.

During input stage 210, data is input into a ML model of a system associated with the network (e.g., network 100 of FIG. 1). Various different types of data can be provided to the ML model. For example, some types of data can include events 212, sampled counter data 214, and relation function 216, among other inputs.

Events 212 can be software and/or programming failures. In other words, events 212 are not hardware counting failures. Each of events 212 can provide information that a failure or condition has been raised and an alarm may be raised.

Sampled counter data 214 can include data of one or more NPUs. For example, an NPU may be associated with data indicating a number of hardware packet drops. Sampled counter data 214 can include a large variety of different types of data. For example, sampled counter data 214 can include drop counters (e.g., per trap), drop packet captures (e.g., per traffic flow), generic drops (e.g., on and/or by a control and/or data plane), system logs, alarms, in/out packet counters per NPU, etc. Unstructured data (e.g., in the form of logs) can be converted into a structure format, filtered, and/or normalized. Streams of traffic can be individually monitored and used to detect metric patterns.

Relation function 216 can be functions configured to receive sampled counter data 214 and form correlations across multiple parameters and/or particular correlations across particular parameters. For example, FIG. 2 illustrates multiple counters, X1 to Xn, being inputted into relation function 216. An example relation function can be $F(x0, x1, \ldots, xn) \rightarrow Y$. In some examples, relation function 216 are linearly increasing functions, exponentially growing functions, other mathematical functions, and/or a combination thereof.

Analysis stage 220 can include event matching 222, trend analysis 224, and threshold classification 226, among other analyses. Analysis stage 220 can receive various outputs from input stage 210.

During event matching 222, events 212 are matched against one or more of events 212 previously identified. In some examples, event match filters can be used to match particular one(s) of events 212 against one or more of events 212 previously identified. Some of events 212 may be indicative of grey failures, while other one(s) of events 212 may be more straightforward failures and/or not relevant to some grey failures. Accordingly, events 212 can be filtered based on the probative value offered by events 212.

During trend analysis 224, sampled counter data 214 are processed through relation functions 216 to determine trends. In some examples, sampled counter data 214 is processed by a trend analysis engine configured to determine trends from sampled counter data 214 based on the relation functions. In some examples, sampled counter data 214 can be used (e.g., by a metric analyzer engine) to generate system and/or network level key performance indicators (KPIs) and/or other metrics to identify patterns. In some examples, trends and/or patterns are generated from sampled counter data 214 across a sliding window. For example, the collected data can be used to identify a pattern in the form of a growth curve of a metric (e.g., number of net packets in/out, packet drops, etc.) over a sliding window. Additional exemplary patterns can include consistent increases or decreases, inconsistent increases or decreases, peaks, plateaus, etc. The sliding window can facilitate detection of trends within a particular time period. Additionally, similar trends across different parameters within the same sliding window may be indicative of a positive correlation between the different parameters.

Threshold classifications 226 can be used to classify and distinguish the metrics and/or sampled counter data 214. For example, sampled counter data 214 can be classified to generate KPIs. In some examples, threshold classifications 226 can be performed using threshold filters. In some examples, the thresholds can be configured by users to customize tolerance for drops and/or other KPIs.

Event aggregation stage 230 can include event counting 232, and event suppression 234, among other event aggregation and post-processing procedures.

During event counting 232, trends developed by trend analysis 224 of sampled counter data 214 using relation functions 216 are associated and matched with events 212 that are probative of grey failures. For example, an increasing trend of dropped packets (e.g., a KPI generated based on sampled counter data 214 that is similarly classified) that occurred during the time period that one or more of events 212 occurred may be matched together. A matched one of events 212 and associated trends, patterns, and/or sampled counter data 214 can be counted and stored as an analyzed event.

During event suppression 234, some of events 212 are suppressed due to low probative value of a grey failure. For example, trends during the sliding window of one or more of events 212 may demonstrate little or no abnormalities. In some instances, there may be little or no correlation across various parameters and/or events 212. These events 212 and the associated trends, patterns, and/or sampled counter data 214 can be suppressed and stored as analyzed events that can be used to further train the ML model.

Figure 3:
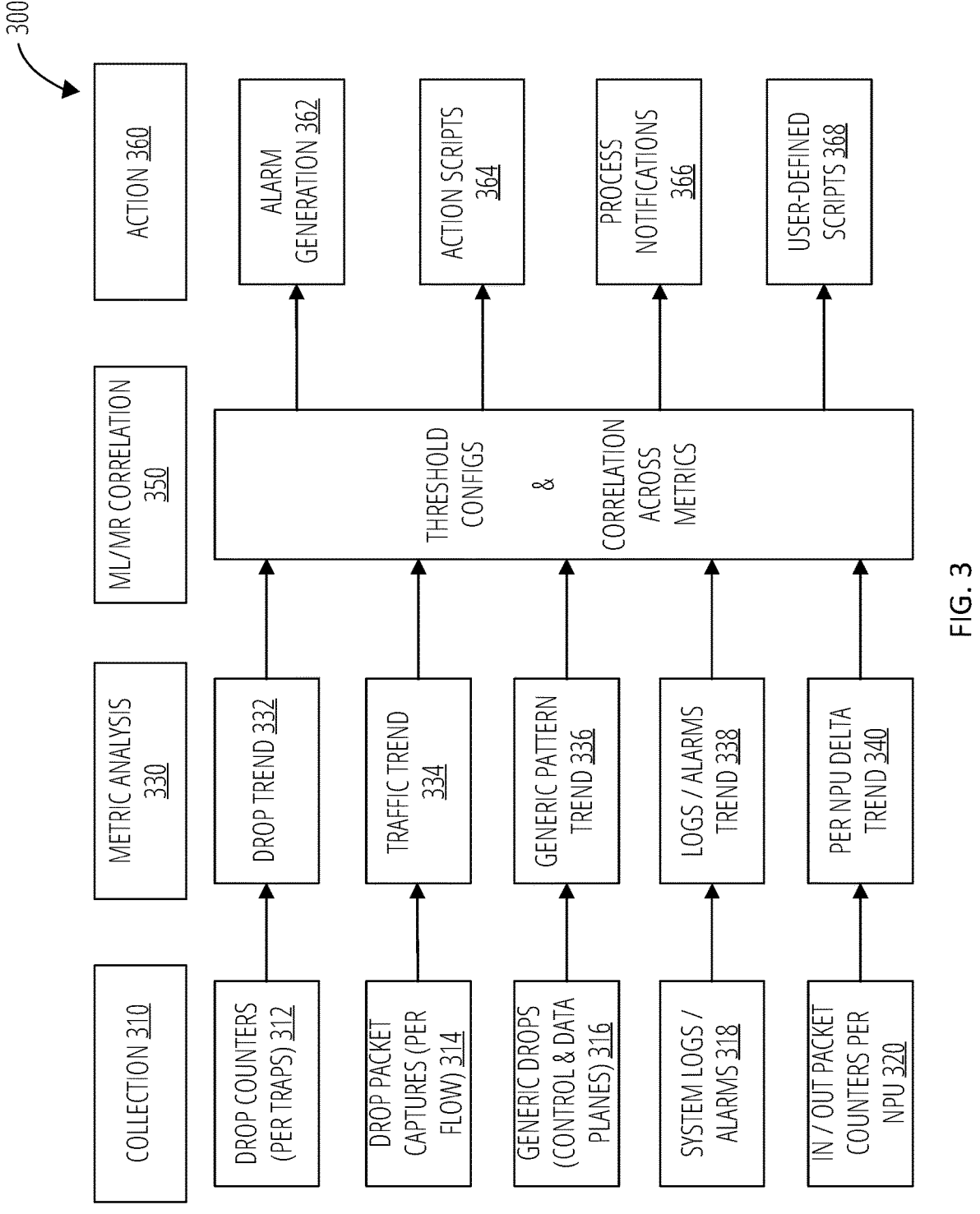
FIG. 3 illustrates an example workflow for detecting grey failures in a network, in accordance with some aspects of the disclosed technology.

FIG. 3 illustrates an example workflow 300 for detecting grey failures on a network. Example workflow 300 can include collection 310, metric analysis 330, ML/MR correlation 350, and one or more actions 360.

Collection 310 can aggregate and/or otherwise collect various different types of data. FIG. 3 illustrates several examples of data including, but not limited to, drop counters 312, drop packet captures 314, generic drops 316, system logs/alarms 318, and packet counters 320. The collector stage gathers the data across sources using well-defined methodologies where the concerned entity pushes the modelled data with an on-change event and/or the collector collects the data through a polled mechanism (e.g., when polling latencies are acceptable). Unstructured data in the form of logs can be converted into structured format, filtered, and/or normalized. The collected data can then be provided to a metric analyzer engine for metric analysis 330.

During metric analysis 330, a processor (e.g., of a metric analyzer engine, NPU, or other network device) can determine trends from collection 310 of data.

Drop counters 312 (e.g., per trap) can be used to generate a drop trend 332. For example, a drop trend may be detected within a particular sliding window.

Drop packet captures 314 can be used to generate a traffic trend 334. For example, a packet output rate that is less than a packet input rate for the flow in a particular sliding window can indicate that packets are being dropped.

Generic drops 316 (e.g., as defined by a control plane and/or data plane) can be used to generate a generic pattern trend 336. For example, generic drops 316 may trend increasingly linearly.

Structured content of system logs/alarms 318 can be used to generate a logs/alarms trend 338. For example, particular expected logs may be received and/or particular alarms may be activated.

Packet counters 320 can be used to generate a delta trend 340. For example, in/out packet counters (e.g., per NPU) can be identify NPU traffic delta between packets that the NPU intakes and packets that the NPU sends out.

During ML/MR correlation 350, drop trend 332, traffic trend 334, generic pattern trend 336, alarms trend 338, and/or delta trend 340 are used by a ML model to identify and generate correlations across collection 310 of data and/or drop trend 332, traffic trend 334, generic pattern trend 336, alarms trend 338, and/or delta trend 340. In some examples, threshold configurations can be used to modify tolerance for correlations across parameters, data, trends, and/or events.

Workflow 300 then can perform action 360, based on an output from ML/MR correlation 350. For example, action 360 can be or otherwise include alarm generation 362, performing action scripts 364 (e.g., to collect logs), generating and sending process notifications 366, and performing user-defined scripts 368, etc.

Workflows 200, 300 can be performed by various components of a network. Workflows 200, 300 can provide these failures to be detected in a methodical and hierarchical approach. For example, the same monitoring system with analytics can be executed in a hierarchical fashion similar to a network topology. For example, the analyzed data can be communicated from leaf network nodes, intermediate network nodes, and/or root network nodes to off-box controllers, which can detect grey failures across the network.

With failure detection for any traffic flow, the proper actions can be performed to remedy the failures. For example, alarms can be raised to inform users to re-route traffic through a different path. As another example, vendor specific scripts and/or user defined scripts can be triggered in a timely manner, which facilitates improved access to logs (e.g., for debugging).

FIG. 4 illustrates an example method 400 for detecting grey failures on a network. Although example method 400 depicts a particular sequence of operations, the sequence may be altered without departing from the scope of the present disclosure. For example, some of the operations depicted may be performed in parallel or in a different sequence that does not materially affect the function of method 400. In other examples, different components of an example device or system that implements method 400 may perform functions at substantially the same time or in a specific sequence. FIG. 4 will be described from the perspective of a network controller. However, one of ordinary skill in the art would understand that the concepts of the present disclosure can be implemented through other entities. For example, method 400 can be performed by a network operating system that can be or otherwise operates on any one of network orchestrator appliance(s) 116, one or more network management appliance(s) 114, and/or one or more network controller appliance(s) 118 of FIG. 1.

In some examples, method 400 includes receiving, by the network controller, a selection by a user to track a first network parameter.

At step 402, method 400 includes receiving, by a network controller, event data for a network node. In some examples, the event data is hierarchically sent from the network node to the network controller through a network of the network controller and the network node. In some examples, the event data is received in a hierarchical manner by the network controller from at least one other network node of the network. In some examples, the network node is a leaf network node of the network. In some examples, the network node is an intermediate network node of the network. In some examples, the network node is a root network node of the network.

At step 404, method 400 includes generating, by the network controller, the first metric and a second metric based on the event data, wherein the first metric is associated with a first network parameter of the event data and the second metric is associated with a second network parameter of the event data. In some examples, the first metric is a number of drop packet captures per flow, and wherein determining the first pattern of growth of the first metric includes determining that an output rate of the network node is less than an input rate of the network node for a flow during the sliding window. In some examples, the first metric includes an in/out packet counter per network node, and wherein the first pattern of growth indicates a network node traffic delta.

At step 406, method 400 includes determining, by the network controller, a first pattern of growth of the first metric and a second pattern of growth of the second metric over a sliding window.

At step 408, method 400 includes determining, by the network controller, a correlation across the first metric and the second metric based on the first pattern and the second pattern. In some examples, determining the correlation includes an analysis based on one or more relation functions, sampled network parameter data, threshold classifications, and historical event data.

At step 410, method 400 includes determining, by the network controller, a grey failure of the network node based on the correlation.

Figure 5:
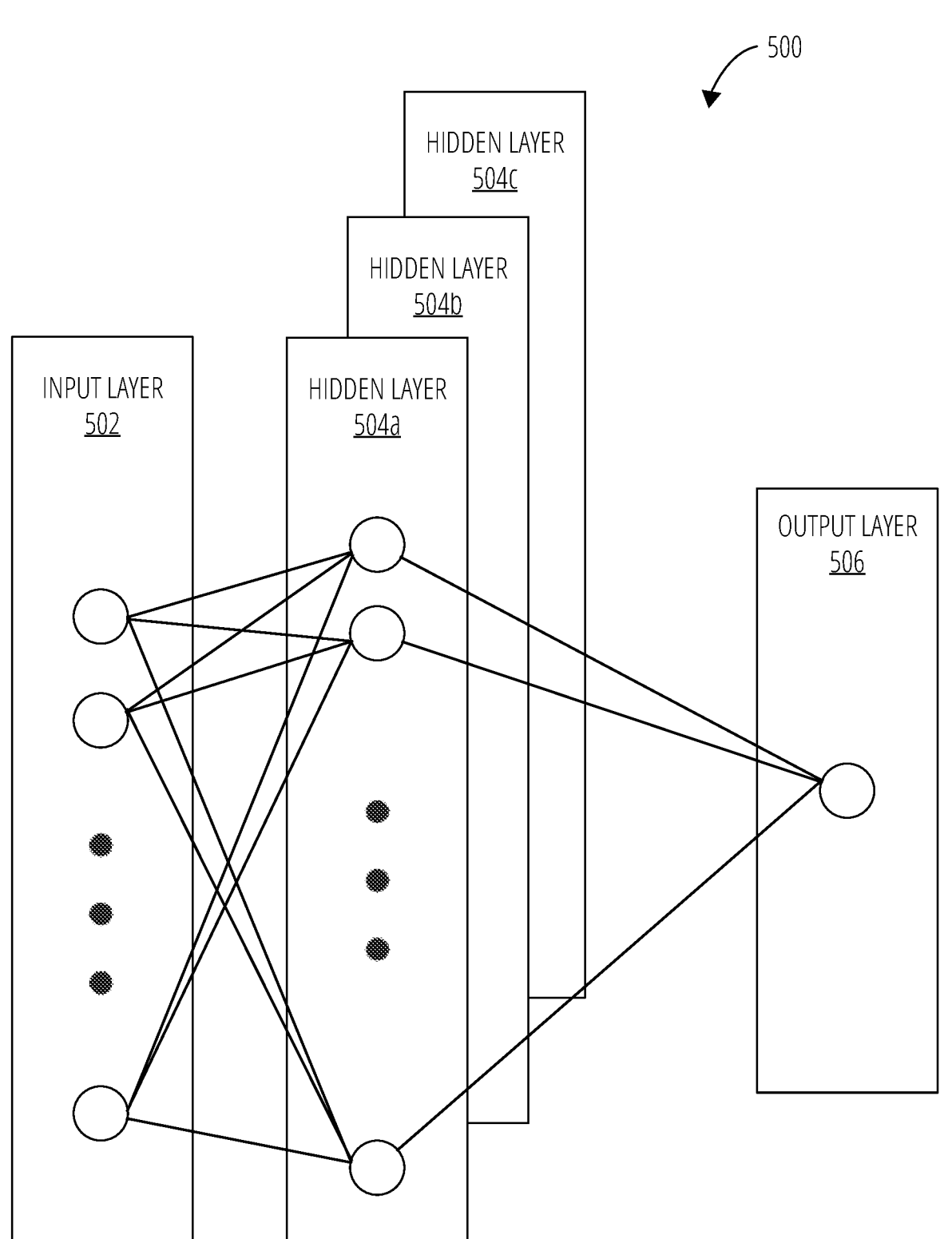
FIG. 5 illustrates an example of a deep learning neural network, in accordance with some aspects of the disclosed technology.

In some embodiments, method 400 includes performing an action based on determining the grey failure of the node. For example, performing the action can be or otherwise include generating an alarm, performing action scripts, collecting and providing logs, generating and sending process notifications, performing user-defined scripts, etc. In some examples, the action may be based on In FIG. 5, the disclosure now turns to a further discussion of models that can be used through the environments and techniques described herein. Neural network 500 includes multiple hidden layers including hidden layer 504a, hidden layer 504b, and hidden layer 504c. The hidden layers can include "n" number of hidden layers, where "n" is an integer greater than or equal to one. The number of hidden layers can be made to include as many layers as needed for the given application. Neural network 500 further includes an output layer 506 that provides an output resulting from the processing performed by hidden layer 504a, hidden layer 504b, and/or hidden layer 504c. In one illustrative example, output layer 506 can provide estimated treatment parameters, that can be used/ingested by a differential simulator to estimate a patient treatment outcome.

Neural network 500 is a multi-layer neural network of interconnected nodes. Each node can represent a piece of information. Information associated with the nodes is shared among the different layers and each layer retains information as information is processed. In some cases, neural network 500 can include a feed-forward network, in which case there are no feedback connections where outputs of the network are fed back into itself. In some cases, the neural network 500 can include a recurrent neural network, which can have loops that allow information to be carried across nodes while reading in input.

Information can be exchanged between nodes through node-to-node interconnections between the various layers. Nodes of input layer 502 can activate a set of nodes in hidden layer 504a. For example, as shown, each of the input nodes of input layer 502 is connected to each of the nodes of hidden layer 504a. The nodes of hidden layer 504a can transform the information of each input node by applying activation functions to the input node information. The information derived from the transformation can then be passed to and can activate the nodes of the next hidden layer such as hidden layer 504b, which can perform their own designated functions. Example functions include convolutional, up-sampling, data transformation, and/or any other suitable functions. The output of hidden layer 504b can then activate nodes of the next hidden layer, and so on. The output of the last hidden layer (e.g., hidden layer 504c) can activate one or more nodes of output layer 506, at which an output is provided. In some cases, while nodes in neural network 500 are shown as having multiple output lines, a node can have a single output and all lines shown as being output from a node represent the same output value.

In some cases, each node or interconnection between nodes can have a weight that is a set of parameters derived from the training of neural network 500. Once neural network 500 is trained, it can be referred to as a trained neural network, which can be used to classify one or more activities. For example, an interconnection between nodes can represent a piece of information learned about the interconnected nodes. The interconnection can have a tunable numeric weight that can be tuned (e.g., based on a training dataset), allowing neural network 500 to be adaptive to inputs and able to learn as more and more data is processed.

Neural network 500 is pre-trained to process the features from the data in input layer 502 using the different hidden layers, such as hidden layer 504a, hidden layer 504b, and hidden layer 504c, in order to provide the output through output layer 506.

In some cases, neural network 500 can adjust the weights of the nodes using a training process called backpropagation. A backpropagation process can include a forward pass, a loss function, a backward pass, and a weight update. The forward pass, loss function, backward pass, and parameter/weight update is performed for one training iteration. The process can be repeated for a certain number of iterations for each set of training data until neural network 500 is trained well enough so that the weights of the layers are accurately tuned.

To perform training, a loss function can be used to analyze error in the output. Any suitable loss function definition can be used, such as a Cross-Entropy loss. Another example of a loss function includes the mean squared error (MSE), defined as $E\_total=\Sigma(\frac{1}{2}(target-output)^2)$. The loss can be set to be equal to the value of E_total.

The loss (or error) will be high for the initial training data since the actual values will be much different than the predicted output. The goal of training is to minimize the amount of loss so that the predicted output is the same as the training output. Neural network 500 can perform a backward pass by determining which inputs (weights) most contributed to the loss of the network, and can adjust the weights so that the loss decreases and is eventually minimized.

Neural network 500 can include any suitable deep network. One example includes a Convolutional Neural Network (CNN), which includes an input layer and an output layer, with multiple hidden layers between the input and out layers. The hidden layers of a CNN include a series of convolutional, nonlinear, pooling (for downsampling), and fully connected layers. Neural network 500 can include any other deep network other than a CNN, such as an autoencoder, Deep Belief Nets (DBNs), Recurrent Neural Networks (RNNs), among others.

As understood by those of skill in the art, machine-learning based classification techniques can vary depending on the desired implementation. For example, machine-learning classification schemes can utilize one or more of the following, alone or in combination: hidden Markov models; RNNs; CNNs; deep learning; Bayesian symbolic methods; Generative Adversarial Networks (GANs); support vector machines; image registration methods; and applicable rule-based systems. Where regression algorithms are used, they may include but are not limited to: a Stochastic Gradient Descent Regressor, a Passive Aggressive Regressor, etc.

Machine learning classification models can also be based on clustering algorithms (e.g., a Mini-batch K-means clustering algorithm), a recommendation algorithm (e.g., a Min-wise Hashing algorithm, or Euclidean Locality-Sensitive Hashing (LSH) algorithm), and/or an anomaly detection algorithm, such as a local outlier factor. Additionally, machine-learning models can employ a dimensionality reduction approach, such as, one or more of: a Mini-batch Dictionary Learning algorithm, an incremental Principal Component Analysis (PCA) algorithm, a Latent Dirichlet Allocation algorithm, and/or a Mini-batch K-means algorithm, etc.

Figure 6:
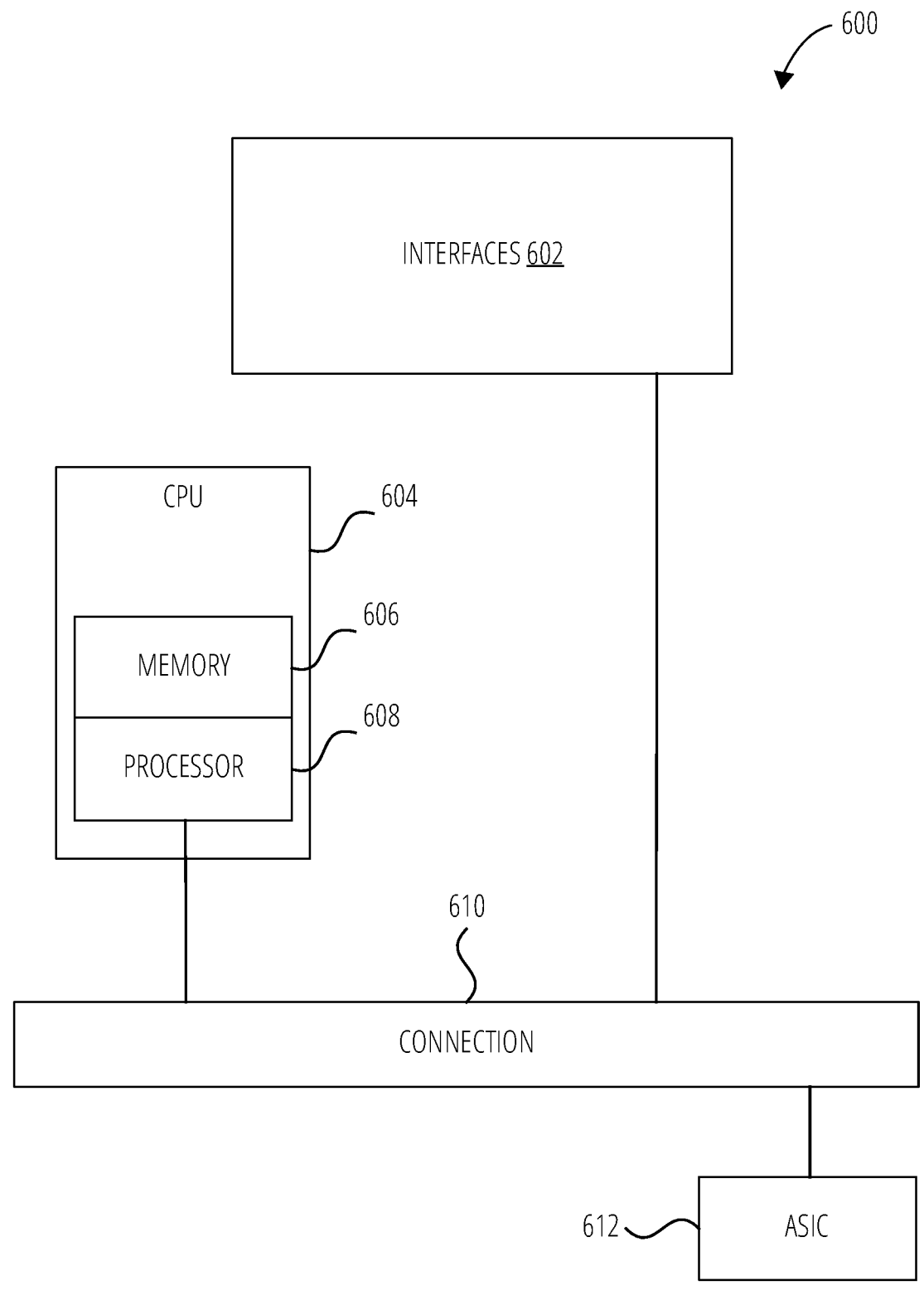
FIG. 6 illustrates an example network device, in accordance with some aspects of the disclosed technology.

FIG. 6 illustrates an example network device 600 suitable for performing switching, routing, load balancing, and other networking operations. Example network device 600 can be implemented as switches, routers, nodes, metadata servers, load balancers, client devices, and so forth.

Network device 600 includes a central processing unit (CPU) 604, interfaces 602, and a bus 610 (e.g., a PCI bus). When acting under the control of appropriate software or firmware, CPU 604 is responsible for executing packet management, error detection, and/or routing functions. CPU 604 preferably accomplishes all these functions under the control of software including an operating system and any appropriate applications software. CPU 604 may include one or more processors such as processor 608, such as a processor from the INTEL X86 family of microprocessors. In some cases, processor 608 can be specially designed hardware for controlling the operations of network device 600. In some cases, a memory 606 (e.g., non-volatile RAM, ROM, etc.) also forms part of CPU 604. However, there are many different ways in which memory could be coupled to the system.

Interfaces 602 are typically provided as modular interface cards (sometimes referred to as "line cards"). Generally, they control the sending and receiving of data packets over the network and sometimes support other peripherals used with network device 600. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communication intensive tasks, these interfaces allow the master CPU (e.g., CPU 604) to efficiently perform routing computations, network diagnostics, security functions, etc.

Although the system shown in FIG. 6 is one specific network device of the present disclosure, it is by no means the only network device architecture on which the present disclosure can be implemented. For example, an architecture having a single processor that handles communications as well as routing computations, etc., is often used. Further, other types of interfaces and media could also be used with network device 600.

Regardless of the network device's configuration, it may employ one or more memories or memory modules (including memory 606) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 606 could also hold various software containers and virtualized execution environments and data.

Network device 600 can also include an application-specific integrated circuit (ASIC) 612, which can be configured to perform routing and/or switching operations. ASIC 612 can communicate with other components in network device 600 via bus 610, to exchange data and signals and coordinate various types of operations by network device 600, such as routing, switching, and/or data storage operations, for example.

Figure 7:
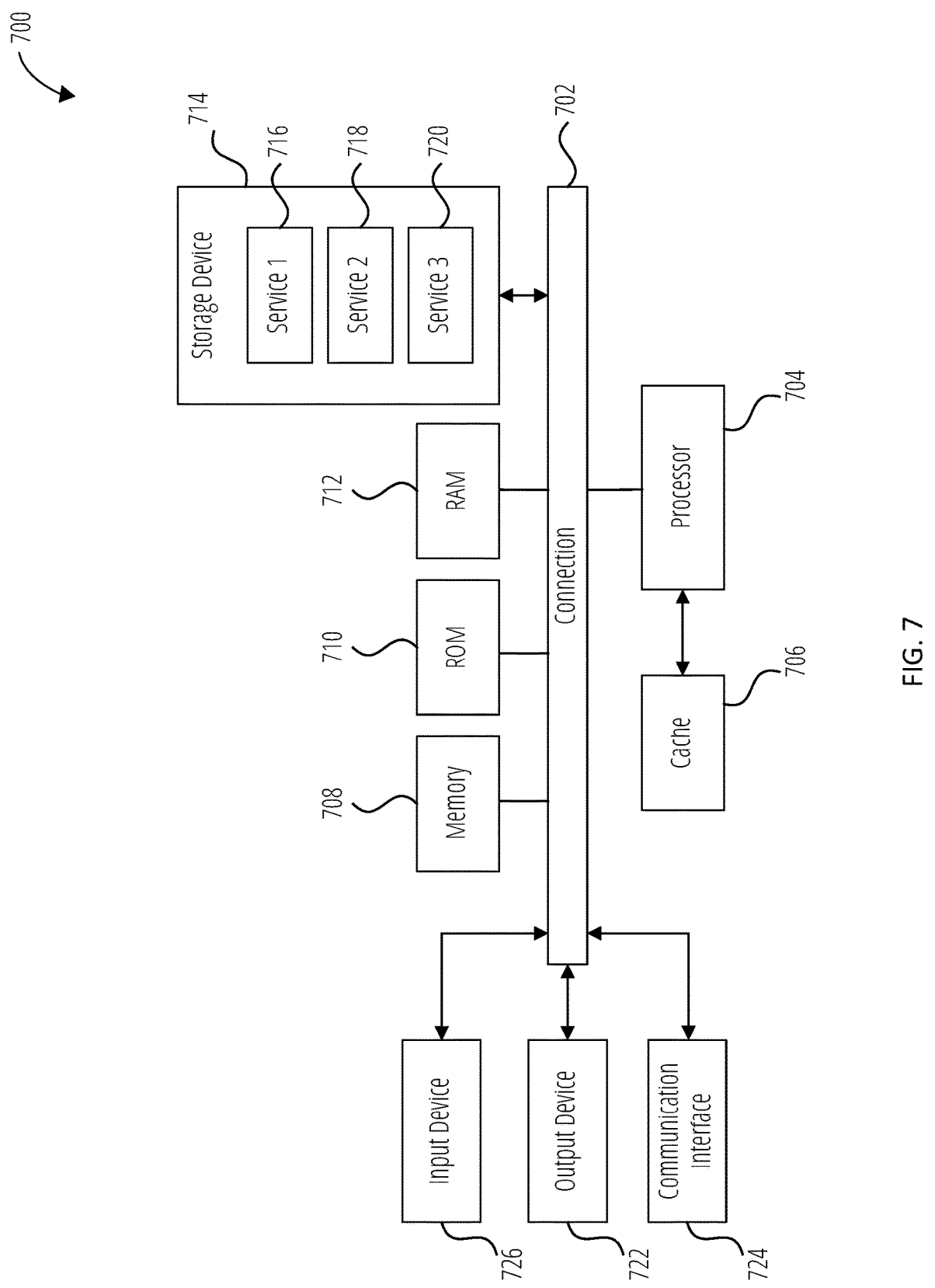
FIG. 7 shows an example of a system for implementing certain aspects of the present technology.

FIG. 7 shows an example of computing system 700, which can be for example any computing device making up network 100 of FIG. 1, a network operating system such as network orchestrator appliance(s) 116, one or more network management appliance(s) 114, and one or more network controller appliance(s) 118 of FIG. 1, etc., or any component thereof in which the components of the system are in communication with each other using connection 702. Connection 702 can be a physical connection via a bus, or a direct connection into processor 704, such as in a chipset architecture. Connection 702 can also be a virtual connection, networked connection, or logical connection.

In some examples, computing system 700 is a distributed system in which the functions described in this disclosure can be distributed within a datacenter, multiple data centers, a peer network, etc. In some examples, one or more of the described system components represents many such components each performing some or all of the function for which the component is described. In some examples, the components can be physical or virtual devices.

Example computing system 700 includes at least one processing unit (CPU or processor) such as processor 704 and connection 702 that couples various system components including system memory 708, such as read-only memory (ROM) 710 and random-access memory (RAM) 712 to processor 704. Computing system 700 can include a cache of high-speed memory 706 connected directly to, indirectly to, or integrated as part of processor 704.

Processor 704 can include any general-purpose processor and a hardware service or software service, such as services 716, 718, and 720 stored in storage device 714, configured to control processor 704 as well as a special-purpose processor where software instructions are incorporated into the actual processor design. Processor 704 may essentially be a completely self-contained computing system, containing multiple cores or processors, a bus, memory controller, cache, etc. A multi-core processor may be symmetric or asymmetric.

To enable user interaction, computing system 700 includes an input device 726, which can represent any number of input mechanisms, such as a microphone for speech, a touch-sensitive screen for gesture or graphical input, keyboard, mouse, motion input, speech, etc. Computing system 700 can also include output device 722, which can be one or more of a number of output mechanisms known to those of skill in the art. In some instances, multimodal systems can enable a user to provide multiple types of input/output to communicate with computing system 700. Computing system 700 can include communication interface 724, which can generally govern and manage the user input and system output. There is no restriction on operating on any particular hardware arrangement, and therefore the basic features here may easily be substituted for improved hardware or firmware arrangements as they are developed.

Storage device 714 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

Storage device 714 can include software services, servers, services, etc., that when the code that defines such software is executed by processor 704, it causes the system to perform a function. In some examples, a hardware service that performs a particular function can include the software component stored in a computer-readable medium in connection with the necessary hardware components, such as processor 704, connection 702, output device 722, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some examples, a service can be software that resides in memory of a client device and/or one or more servers of a content management system and perform one or more functions when a processor executes the software associated with the service. In some examples, a service is a program, or a collection of programs that carry out a specific function. In some examples, a service can be considered a server. The memory can be a non-transitory computer-readable medium.

In some examples, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method for detecting grey failures on a network, the method comprising:

receiving, by a network controller, event data for a network node, the event data including a collection of independent parameters associated with performance of the network;

generating, by the network controller, a first metric and a second metric based on the event data, wherein the first metric is associated with a first network parameter received as part of the event data and the second metric is associated with a second network parameter received as part of the event data, the first network parameter being independent of the second network parameter;

determining, by the network controller, a first pattern of growth of the first metric and a second pattern of growth of the second metric over a sliding window, wherein determining the first pattern of growth and the second pattern of growth comprises identifying a growth curve for each respective metric over the sliding window;

determining, by the network controller, a correlation across the first metric and the second metric based on the first pattern and the second pattern, wherein determining the correlation comprises determining that the growth curve of the first metric and the growth curve of the second metric exhibit similar trends within the sliding window; and determining, by the network controller, a grey failure of the network node based on the correlation.

2. The method of claim 1, wherein, the first metric is a number of drop packet captures per flow, and determining the first pattern of growth of the first metric includes determining that an output rate of the network node is less than an input rate of the network node for a flow during the sliding window.

3. The method of claim 1, wherein the first metric includes an in/out packet counter per network node, and wherein the first pattern of growth indicates a network node traffic delta.

4. The method of claim 1, further comprising:

receiving, by the network controller, a selection by a user to track the first network parameter.

5. The method of claim 1, wherein determining the correlation includes an analysis based on one or more relation functions, sampled network parameter data, threshold classifications, and historical event data.

6. The method of claim 1, wherein the event data is hierarchically sent from the network node to the network controller through a network of the network controller and the network node.

7. The method of claim 6, wherein the network node is a leaf network node of the network.

8. One or more non-transitory computer-readable media comprising computer-readable instructions stored thereon, wherein the computer-readable instructions, when executed by one or more processors of a network controller, cause the one or more processors to:

receive event data for a network node, the event data including a collection of independent parameters associated with performance of the network;

generate a first metric and a second metric based on the event data, wherein the first metric is associated with a first network parameter received as part of the event data and the second metric is associated with a second network parameter received as part of the event data, the first network parameter being independent of the second network parameter;

determine a first pattern of growth of the first metric and a second pattern of growth of the second metric over a sliding window, wherein determining the first pattern of growth and the second pattern of growth comprises identifying a growth curve for each respective metric over the sliding window;

determine a correlation across the first metric and the second metric based on the first pattern and the second pattern, wherein determining the correlation comprises determining that the growth curve of the first metric and the growth curve of the second metric exhibit similar trends within the sliding window; and determine a grey failure of the network node based on the correlation.

9. The one or more non-transitory computer-readable media of claim 8, wherein, the first metric is a number of drop packet captures per flow, and execution of the computer-readable instructions, by the one or more processors, cause the network controller to determine the first pattern of growth of the first metric includes determining that an output rate of the network node is less than an input rate of the network node for a flow during the sliding window.

10. The one or more non-transitory computer-readable media of claim 8, wherein the first metric includes an in/out packet counter per network node, and wherein the first pattern of growth indicates a network node traffic delta.

11. The one or more non-transitory computer-readable media of claim 8, wherein execution of the computer-readable instructions, by the one or more processors, cause the network controller to:

receive a selection by a user to track the first network parameter.

12. The one or more non-transitory computer-readable media of claim 8, wherein execution of the computer-readable instructions, by the one or more processors, cause the network controller to determine the correlation by analyzing, based on one or more relation functions, sampled network parameter data, threshold classifications, and historical event data.

13. The one or more non-transitory computer-readable media of claim 8, wherein the event data is hierarchically sent from the network node to the network controller through a network of the network controller and the network node.

14. The one or more non-transitory computer-readable media of claim 13, wherein the network node is a leaf network node of the network.

15. A network controller comprising:

one or more processors; and one or more memories configured to store computer-readable instructions thereon, which when executed by the one or more processors, cause the one or more processors to:

receive event data for a network node, the event data including a collection of independent parameters associated with performance of the network;

generate a first metric and a second metric based on the event data, wherein the first metric is associated with a first network parameter received as part of the event data and the second metric is associated with a second network parameter received as part of the event data, the first network parameter being independent of the second network parameter;

determine a first pattern of growth of the first metric and a second pattern of growth of the second metric over a sliding window, wherein determining the first pattern of growth and the second pattern of growth comprises identifying a growth curve for each respective metric over the sliding window;

determine a correlation across the first metric and the second metric based on the first pattern and the second pattern, wherein determining the correlation comprises determining that the growth curve of the first metric and the growth curve of the second metric exhibit similar trends within the sliding window; and determine a grey failure of the network node based on the correlation.

16. The network controller of claim 15, wherein, the first metric is a number of drop packet captures per flow, and the one or more processors are configured to execute the computer-readable instructions to determine the first pattern of growth of the first metric by determining that an output rate of the network node is less than an input rate of the network node for a flow during the sliding window.

17. The network controller of claim 15, wherein the first metric includes an in/out packet counter per network node, and wherein the first pattern of growth indicates a network node traffic delta.

18. The network controller of claim 15, wherein the one or more processors are configured to execute the computer-readable instructions to:

receive a selection by a user to track the first network parameter.

19. The network controller of claim 15, wherein the one or more processors are configured to execute the computer-readable instructions to determine the correlation by analyzing, based on one or more relation functions, sampled network parameter data, threshold classifications, and historical event data.

20. The network controller of claim 15, wherein the event data is hierarchically sent from the network node to the network controller through a network of the network controller and the network node.

* * * * *